Figure 1:
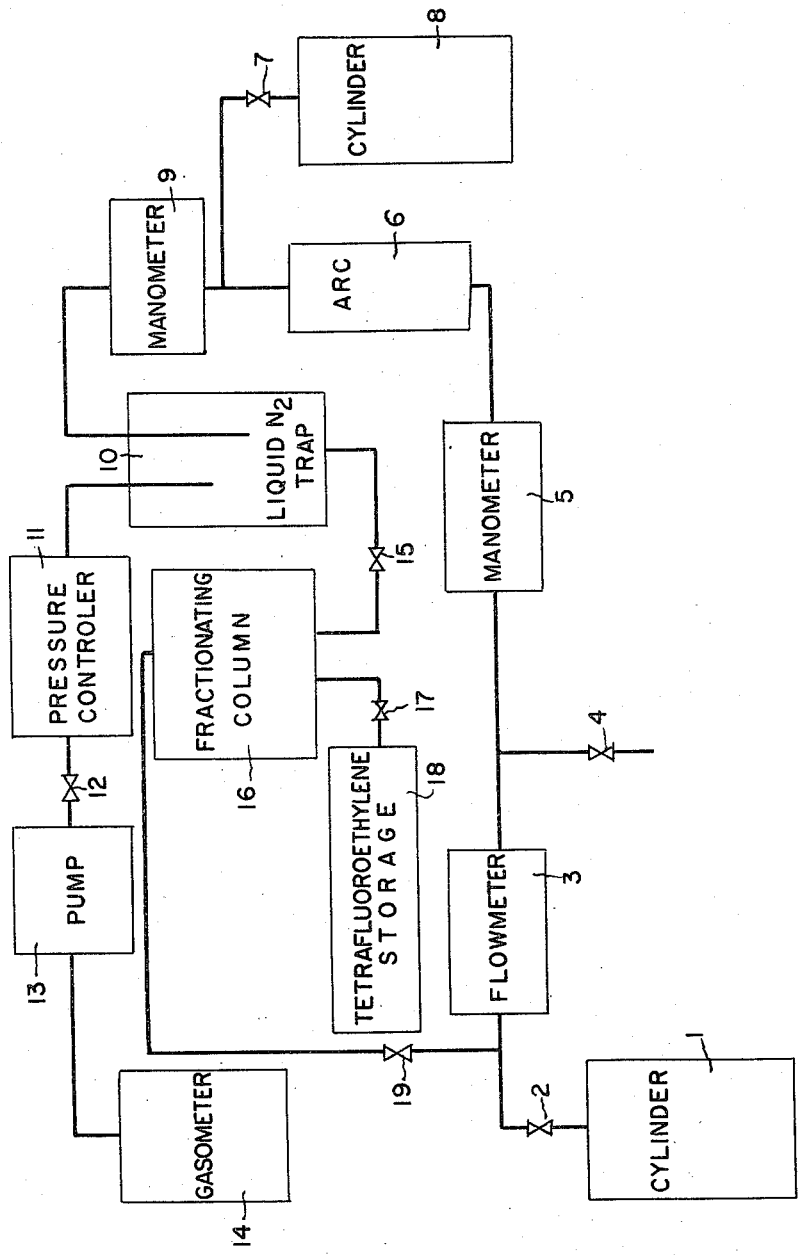

United States Patent Office 2,709,189
Patented May 24, 1955

2,709,189

PREPARATION OF FLUORINE-CONTAINING COMPOUNDS BY REACTING CARBON WITH CARBONYL FLUORIDE

Mark W. Farlow, Wilmington, and Earl L. Muetterties, Hockessin, Del., assignors to E. I. du Pont de Nemours and Company, Wilmington, Del., a corporation of Delaware Application April 1, 1954, Serial No. 420,472

5 Claims. (Cl. 260—653)

This invention relates to a new process for preparing fluorine-containing compounds, particularly fluorocarbons, and other related products formed simultaneously therewith.

Compounds containing only fluorine and carbon, which are known as fluorocarbons, possess considerable utility in many fiields of applied chemistry, for example, as refrigerants, dielectric fluids, intermediates for polymeric materials, propellants in aerosol compositions, etc. One of these fluorocarbons, tetrafluoroethylene, has achieved commercial success in the form of its polymers. However, wider uses for tetrafluoroethylene and other fluorocarbons would be attained were there more economical methods for their preparation.

The present invention is directed to a process for synthesizing fluorocarbons, especially tetrafluoroethylene, which comprises heating carbon at a temperature of at least 1500° C. with a compound composed of carbon, fluorine, and at least one other element, the atomic ratio of fluorine to other element or elements being at least 1:1. Compounds which are especially suitable for use as starting materials in the process of this invention are those of the above-defined type in which the elements other than carbon and fluorine are one or more of the following: hydrogen, chlorine, bromine, oxygen, and sulfur.

A group of compounds which is especially preferred for reaction with carbon in the process of this invention because of their accessibility and potentially low cost is that consisting of compounds of fluorine, carbon, and a chalcogen of atomic number less than 17, i. e., oxygen or sulfur, of the formula $F_2C=X$, wherein X is sulfur or oxygen.

The reaction gives a mixture of products, the principal fluorocarbons being tetrafluoroethylene and carbon tetrafluoride with smaller proportions of hexafluoroethane, hexafluoropropene, and octafluoropropane. Gaseous carbon oxides, e. g., carbon dioxide and carbon monoxide, are formed as by-products in the reaction when the reactant contains oxygen in addition to carbon and fluorine.

The process of this invention can be carried out in various ways. In one embodiment, the vaporized compound of the formula $F_2C=X$ can be passed through a tube made of carbon or of other refractory material packed with carbon heated at a temperature of at least 1500° C. The reactor tube can be heated in any suitable manner, e. g., by an electric resistance or induction furnace. The gaseous reaction products can then be passed through cold condensers, or traps, to isolate liquid reaction products. When tetrafluoroethylene is the desired fluorocarbon, it is preferable to cool the hot reaction products rapidly to a temperature below 400° C. The time of transition from the reaction temperature to 400° C. should not exceed one second and is preferably in the range of 0.001 to 0.1 second to obtain best yields of tetrafluoroethylene. The liquefied fluorocarbons and any unreacted starting material can be separated by fractional distillation in efficient fractionating columns. Optionally, the crude reaction products can be passed through aqueous solutions of an alkali, e. g., sodium hydroxide, to cool the reaction products and to absorb any acidic by-products, e. g., carbon dioxide.

A preferred embodiment of the invention involves passing a compound of the formula $F_2C=X$ through the arc produced by passing an electric current between carbon electrodes where the temperature is generally estimated to be in the range of 2500° to 4000° C. In this method, the reaction products can be cooled, purified, and isolated as described previously.

Another embodiment of the process of this invention which is particularly useful when the starting fluorine-containing carbon compound is liquid at ordinary temperatures consists in submerging a carbon arc in the liquid fluorine-containing carbon compound. In this particular process the fluorine-containing reactant is vaporized by the arc, reacts with the carbon of the arc, and is then very rapidly cooled by the surrounding liquid reactant.

To obtain most efficient operation of this process, it is desirable to recycle any unreacted starting material and any undesired fluorocarbon products. Thus, to obtain highest yields of tetrafluoroethylene from the reaction of carbon with a fluorine-containing compound such as, for example, carbonyl fluoride, any unreacted carbonyl fluoride and the fluorocarbon by-products from the first pass through the heated reaction zone are recycled. The fluorocarbon by-products having one to two carbons are in turn converted to tetrafluoroethylene during the recycling step by a process described in application Serial No. 477,678, filed December 27, 1954, by M. W. Farlow and the fluorocarbon by-products having three or more carbon atoms are converted to tetrafluoroethylene during the recycling step by a process described in application Serial No. 390,461, filed November 6, 1953, by M. W. Farlow.

The reaction temperature must be at least 1500° C. and can be high as can practically be obtained by known means. Extremely high temperatures, i. e., above 2500° C., such as can be achieved by the use of a carbon arc, represent a preferred embodiment since they lead to higher conversions per pass and increase the proportions of the highly valuable tetrafluoroethylene in the reaction product. The relative proportions of the two reactants are not critical insofar as the course of the reaction is concerned. However, it is desirable for economic reasons to have the carbon present in excess in order to utilize to the greatest extent the more expensive fluorine-containing carbon compound.

The pressure at which the reaction is carried out can be varied over wide limits. Satisfactory results can be obtained at pressures ranging from as low as 1 mm. of mercury absolute, or lower, up to superatmospheric pressures. Atmospheric and superatmospheric pressures are useful when it is desired to carry out the reaction with submerged electrodes.

The fluorine-containing carbon compound used as reactant in the process of this invention need not be rigorously pure. Commercially available materials or compounds made by known methods are entirely suitable. Anhydrous reactants are not essential; however, it is preferable to use reactants substantially free of moisture.

Any form of carbon, either amorphous or crystalline, is suitable for use in the process of this invention. Thus, there can be used coal, graphite, diamond, charcoal, and the various forms of carbon black, such as lamp black, acetylene black, bone black, etc. The powdered forms of carbon are, of course, used as packings in the form of pellets or on supports, such as coke. In general, best results are obtained with active carbon, of which many well-known varieties are available commercially. In general, active carbon is very finely divided porous carbon having a total surface area of at least 20 square meters per gram (Hassler, "Active Carbon," Chemical Publishing Company, 1951, page 127). When a carbon arc is used in the process, the activity or state of subdivision of the carbon is apparently of no consequence, but the carbon must, of course, possess sufficient conductivity.

The invention is described in greater detail in the following examples, which illustrate the reaction of carbonyl fluoride with the carbon in an electric arc.

Figure 2:
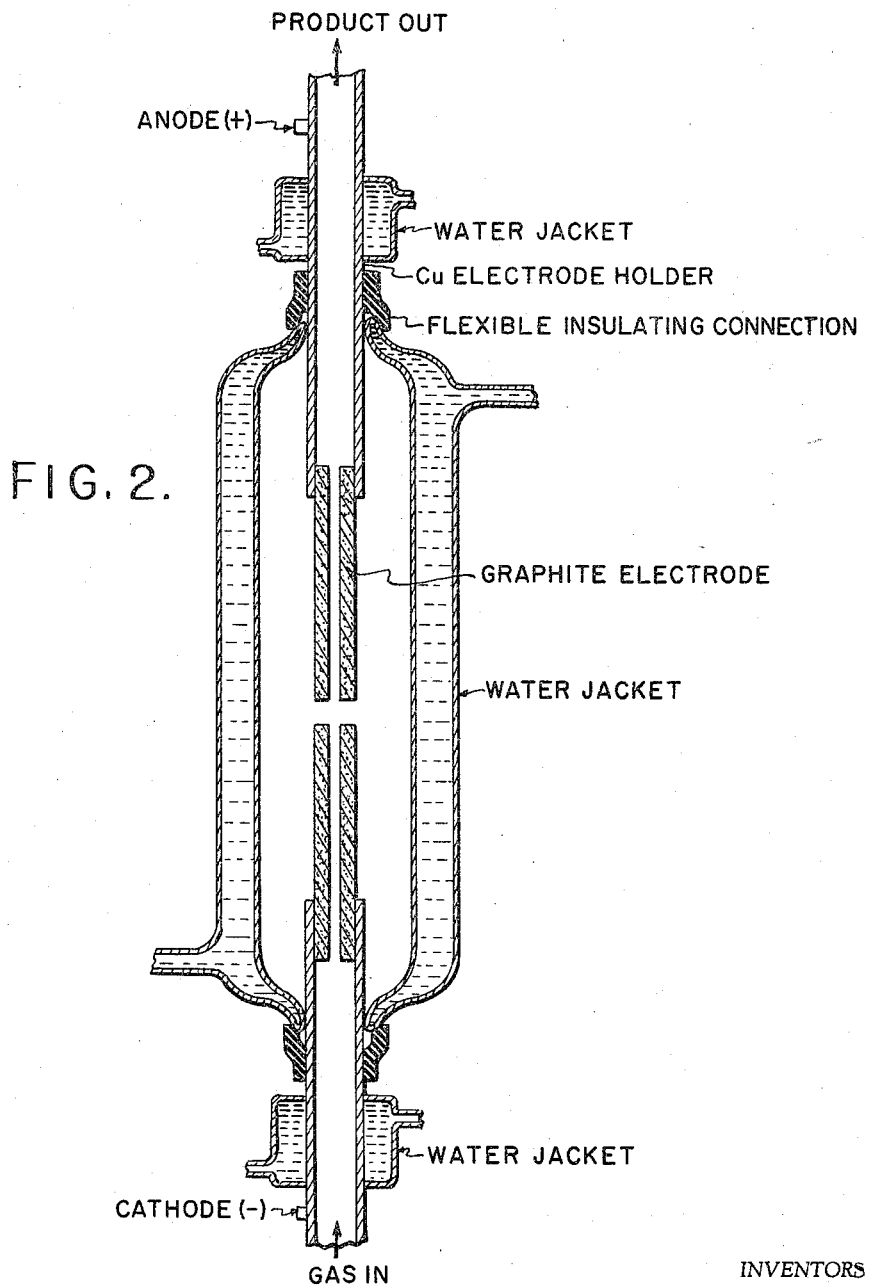
Figure 3:
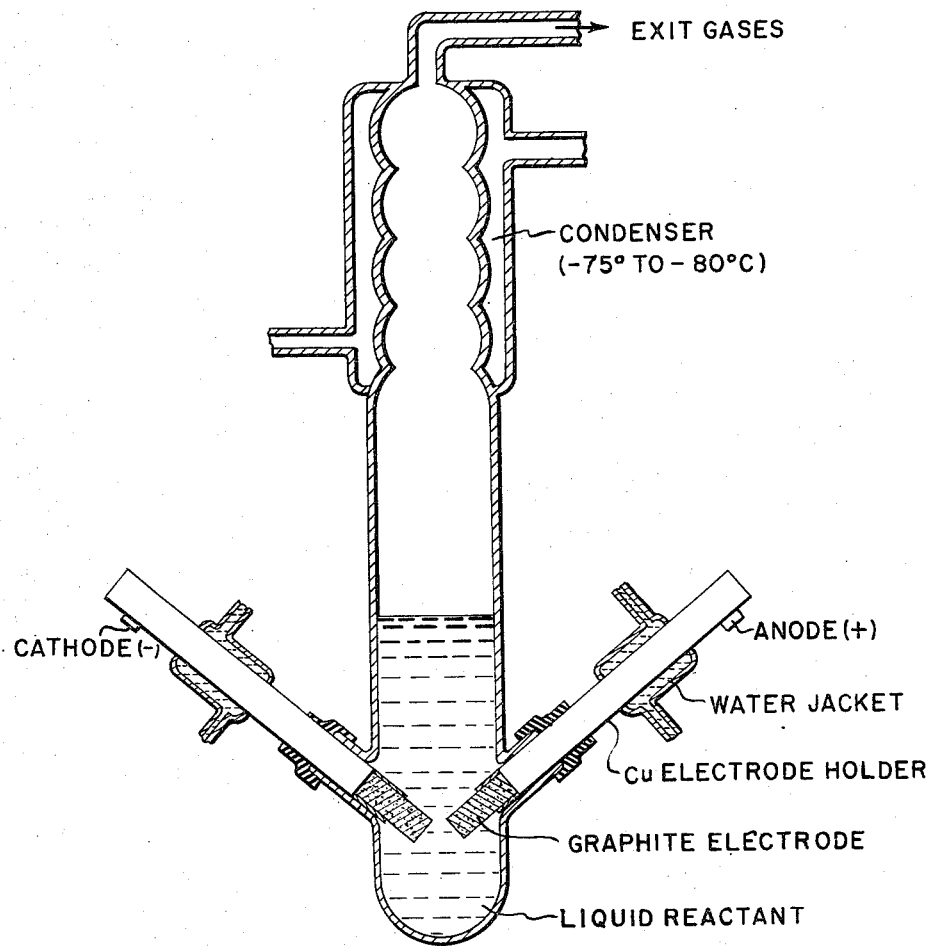
Figure 4:
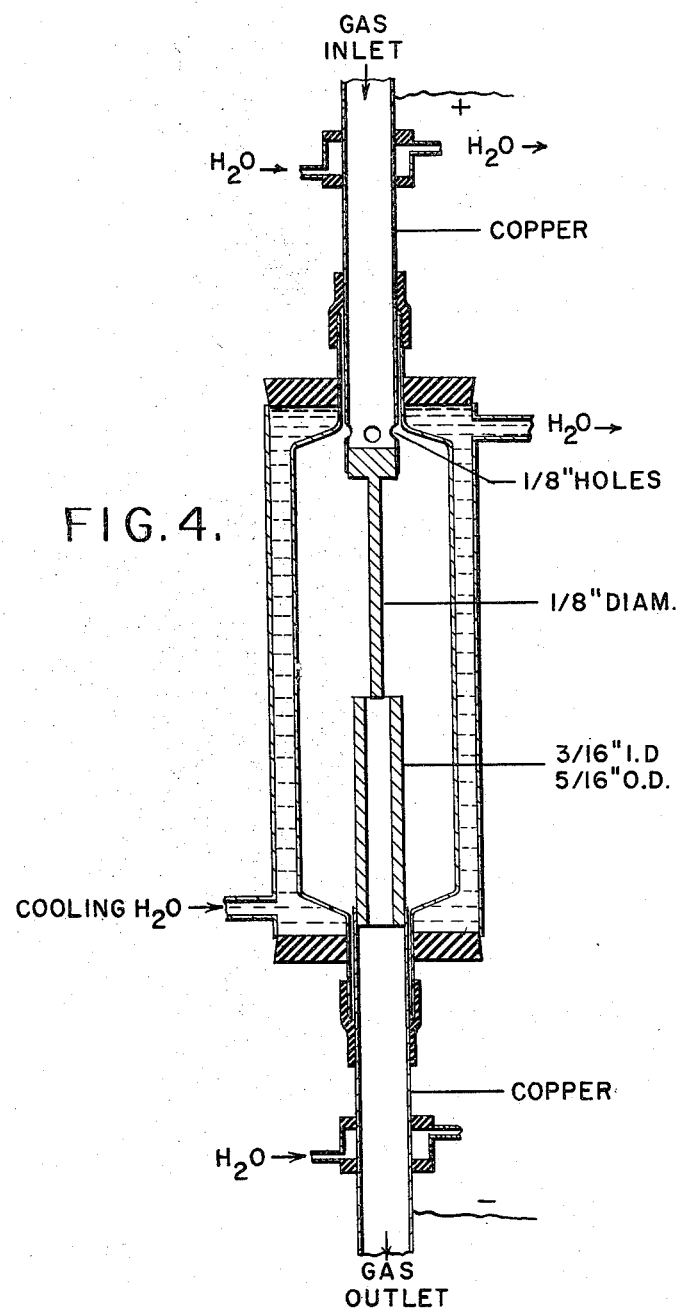

A flow sheet of the equipment and process used in reacting a compound of carbon, fluorine, and at least one other element with the electrodes of a carbon arc is shown in Figure 1. A detail of an arc used with gaseous reactants is shown in Figure 2. A detail of a type of apparatus having a carbon arc submerged in liquid fluorine-containing reactant is shown in Figure 3. Another form of apparatus which can be used is shown in Figure 4.

Referring to Figure 1, the gas lines are of copper tubing. In a typical operation the compound of carbon, fluorine, and another element is contained in cylinder or tank 1. Valves 2, 4, 15, and 19 are closed, and valves 7 and 12 are opened. The apparatus is evacuated by means of pump 13 to remove the air, trap 10 is cooled with liquid nitrogen, valve 7 is closed, argon (or other inert gas) is admitted through valve 4 to the desired operating pressure, and pressure controller 11 is set to maintain that desired pressure. The arc 6 is struck, the reactant gas is passed through the arc at the desired rate (flowmeter 3) and the product is condensed in trap 10, except noncondensable gases which pass through controller 11, pump 13, and into gas reservoir 14. During operation the arc inlet pressure (manometer 5) will be appreciably higher than the exit pressure (manometer 9) because of the constriction involved in the arc passages. When it is desired to stop the reaction, the arc current is cut off, valves 2 and 12 are closed, valve 7 is opened, cylinder 8 is cooled with liquid nitrogen, and trap 10 is allowed to warm to room temperature, and the volatile product is distilled into cylinder 8. Finally, if desired, cylinder 8 can be pumped to remove traces of argon, or other noncondensables, after which the cylinder valve 7 is closed and the product is allowed to warm to room temperature.

In continuous operation where unreacted starting material and fluorocarbon by-products are recycled, the trap 10 is connected through valve 15 to fractionating column 16 which separates, as far as possible, the tetrafluoroethylene from the reaction products of the arc, sends the tetrafluoroethylene of greater or less purity, depending on the grade desired, to tetrafluoroethylene storage 18 and returns the remaining starting material and fluorocarbon by-products through valve 19 and flowmeter 3 to the arc 6. If desired, the by-products before being sent back into the arc 6 can be passed through an alkaline scrubber to remove acidic gases, such as carbon dioxide.

A detail of an arc suitable for use with gaseous reactants is shown in Figure 2. The electrodes consist of graphite cylinders. The water jackets are made of electrically nonconductive material, or if they are made of electrically conductive material they are insulated from the electrode holders. The arc is struck by contacting the two electrodes through manipulation of one of the two flexible rubber connections, care being taken to avoid contact with uninsulated portions of the apparatus. Thereafter the electrode gap is controlled to effect the requisite current. Either direct or alternating current can be applied across the electrodes at widely varying voltages. In the case of alternating current, the frequency of the current can be varied over a wide range. Good results are obtained when a direct current of 10 to 30 amperes at 10 to 50 volts is employed. However, the process is not limited to the use of this narrow range of amperage and voltage.

Referring to Figure 3, a detail is given of apparatus having a carbon arc submerged in a liquid reactant. In this type of apparatus the pyrolysis products are rapidly cooled to the temperature of the refluxing liquid reactant. In this apparatus the arc is operated in the same manner as described in the preceding paragraph.

Referring to Figure 4, a detail is given of a type of carbon arc equipment which is very efficient and which gives very high conversions to fluorocarbons of the compounds of carbon, fluorine and at least one other element as defined previously. In this equipment one electrode is hollow and the other is solid. The gaseous reactants enter the reaction chamber through holes in the upper electrode holder, pass around the solid electrode and between the adjacent ends of the two electrodes and then out through the center of the hollow electrode. When the solid electrode is smaller in diameter than the inner diameter of the hollow electrode, the arc can be operated with the end of the solid electrode a short distance above the end of the hollow electrode, parallel with the end of the hollow electrode, or extending into the center of the hollow electrode. The exact position selected is dependent on the particular reactant being passed through the arc, the position being chosen which provides the best arc under operating conditions. The relative positions of the two electrodes can be changed, if desired, during operation. This is sometimes necessary to maintain the optimum arc. The solid electrode can also be larger in diameter than the inner diameter of the hollow electrode. If desired, it can even be larger than the outer diameter of the hollow electrode. The solid electrode is designated as the anode in the drawing; however, it can be the cathode and the hollow electrode can be the anode, if desired.

*Example 1.*—Gaseous carbonyl fluoride (prepared from phosgene and antimony trifluoride, and containing small amounts of phosgene and carbonyl chlorofluoride as impurities) is passed through a carbon arc produced by graphite electrodes of 0.1 inch internal diameter (Figures 1 and 2) at a rate of 40 to 45 grams per hour, an arc pressure of 0.04 to 0.10 atmosphere, absolute. The arc is operated at 25 volts direct current and 18 amperes. The products are cooled from arc temperature to below 400° C. in less than about 1.0 second. The product contains, in addition to unchanged carbonyl fluoride and gaseous carbon oxides, 20 to 25 mole per cent of alkali-insoluble gases which consist mainly of tetrafluoroethylene, carbon tetrafluoride, dichlorodifluoromethane, and chlorotrifluoromethane, in a molar ratio of about 1, 2, 1, and 1. Tetrafluoroethylene could be separated from the mixed product by distillation, and the other products could be recycled with more carbonyl fluoride to produce further quantities of tetrafluoroethylene.

*Example 2.*—Essentially pure, gaseous carbonyl fluoride is passed through a carbon arc as in Example 1, except that the flow rate is about 22 grams per hour, the arc pressure is 9–22 mm. of mercury, absolute, and the arc is operated at 21 to 24 volts D. C. and 16 to 18 amperes. The off-gas contains about 7.5 mole per cent of tetrafluoroethylene, 7.5 mole per cent of carbon tetrafluoride, one mole per cent of hexafluoroethane, and 80–84 mole per cent of unchanged carbonyl fluoride.

*Example 3.* — 1,2-dichloro-1,1,2,2-tetrafluoroethane is passed through a carbon arc under the conditions given in Example 1 except that the flow rate is 63.6 grams per hour. The gaseous reaction product contains about 20 mole per cent tetrafluoroethylene, 5 mole per cent tetrafluoromethane, 30 mole per cent monochlorotrifluoromethane, 20 mole per cent dichlorodifluoromethane, and 20 mole per cent of unchanged 1,2-dichloro-1,1,2,2-tetrafluoroethane.

*Example 4.*—Monochloropentafluoroethane is passed through a carbon arc under the conditions given in Example 1 except that the flow rate is 60 grams per hour. The gaseous reaction product contains about 15 mole per cent tetrafluoroethylene, 20 mole per cent tetrafluoromethane, 10 mole per cent hexafluoroethane, 30 mole per cent monochlorotrifluoromethane, and 20 mole per cent unchanged monochloropentafluoroethane.

*Example 5.*—Essentially pure, gaseous carbonyl fluoride is passed through the arc produced between graphite electrodes of the type illustrated by Figure 4. In this apparatus the solid electrode is one-eighth inch in diameter and the hollow electrode has an external diameter of five-sixteenths inch and an internal diameter of three-sixteenths inch. The carbonyl fluoride is passed through the arc at a rate of 39.6 grams per hour under a pressure of 19 to 24 mm. of mercury, absolute, and the arc is operated at 26.4 volts and 19 amperes direct current. The reaction product contains about 35 mole per cent of tetrafluoroethylene, 20 mole per cent of carbon tetrafluoride, 10 mole per cent of hexafluoroethane, and 35 mole per cent of unreacted carbonyl fluoride. By suitable calculations this is seen to be an 80%, by weight, conversion of carbonyl fluoride to fluorocarbon products in one pass through the carbon arc.

The examples have illustrated this invention by the pyrolysis of particular fluorine-containing compounds in the presence of a carbon arc. However, the process can be carried out by heating any compound of the kind hereinabove set forth with carbon at a temperature of at least 1500° C. The manner in which the various elements in the fluorine-containing carbon compound are joined is not critical. At the temperature at which the reaction is carried out, fluorocarbons, including tetrafluoroethylene, are formed. Consequently, a wide variety of fluorine-containing carbon compounds are operable. A group of compounds which can be employed satisfactorily is made up of those which contain at least one carbon atom and an insufficient number of fluorine atoms per molecule to be a fluorocarbon, said number being, however, at least twice the number of carbon atoms in the molecule. Specific examples of compounds that can be used in the process of this invention include: difluoromethane, trifluoromethane, trifluorochloromethane, dichlorodifluoromethane, dibromodifluoromethane, trifluorobromomethane, dichlorotetradecafluoroheptane, monochloropentadecafluoroheptane, monochlorotrifluoroethylene, 1,2,2-trichloro-1,1,2-trifluoroethane, 1,2-dibromoperfluoropropane, and thiocarbonyl fluoride.

We claim:

1. A process for production of tetrafluoroethylene which comprises conducting carbonyl fluoride through a carbon arc at a pressure of 0.04 to 0.1 atmosphere, cooling the resulting product from arc temperature to below 400° C. in less than one second, whereby a mixed product containing tetrafluoroethylene is produced, and thereafter separating tetrafluoroethylene from the resulting mixture.

2. A process for the production of tetrafluoroethylene which comprises heating carbon with a compound of the formula $F_2C=X$, X being a chalcogen of atomic number less than 17, at a temperature of at least 1500° C., whereby tetrafluoroethylene is formed by reaction between said carbon and said compound of the formula $F_2C=X$, and thereafter separating tetrafluoroethylene from the resulting mixture.

3. Process of claim 2 wherein the said compound of the formula $F_2C=X$ is carbonyl fluoride.

4. Process of claim 3 wherein the said carbonyl fluoride is passed through a carbon arc at a temperature of 2500° to 4000° C.

5. Process of claim 4 wherein the said arc employs a current of 10 to 30 amperes at 10 to 50 volts.

References Cited in the file of this patent

UNITED STATES PATENTS

| 2,551,573 | Downing et al. | May 8, 1951 |

FOREIGN PATENTS

| 120,339 | Australia | Sept. 3, 1945 |
| 619,394 | Great Britain | Mar. 8, 1949 |